United States Patent [19]

Boyett et al.

[11] 4,206,550
[45] Jun. 10, 1980

[54] POINT-TO-POINT SELF-PLUMBING APPARATUS AND METHOD

[76] Inventors: Vernon H. Boyett, 200 S. Delaware Ave. Apt. 2, San Mateo, Calif. 94401; Robert W. Devine, 728 Alta Vista, Pacifica, Calif. 94044

[21] Appl. No.: 933,517

[22] Filed: Aug. 14, 1978

Related U.S. Application Data

[63] Continuation-in-part of Ser. No. 712,868, Aug. 9, 1976, Pat. No. 4,106,207.

[51] Int. Cl.² .................. G01C 15/02; G01C 15/10
[52] U.S. Cl. .......................................... 33/286; 33/227; 33/228; 33/299; 33/DIG. 1
[58] Field of Search ............... 33/227, 286, 291, 299, 33/397, 228, 275, 293, 370, 371, DIG. 1

[56] References Cited

U.S. PATENT DOCUMENTS

| | | | |
|---|---|---|---|
| 1,660,833 | 2/1928 | Cronjaeger | 33/293 |
| 2,517,295 | 8/1950 | Esher | 33/275 R |
| 2,553,668 | 5/1951 | Morello | 33/DIG. 1 |
| 2,794,263 | 6/1957 | Cranmer | 33/DIG. 1 |
| 3,505,739 | 4/1970 | Abrams | 33/227 |
| 3,715,808 | 2/1973 | Petrik | 33/371 |
| 3,716,920 | 2/1973 | Worthen | 33/370 |
| 3,772,797 | 11/1973 | Gleba | 33/227 |
| 3,911,588 | 10/1975 | Ohneda | 33/227 |

FOREIGN PATENT DOCUMENTS 1162395 9/1958 France ....................... 33/227

Primary Examiner—Richard R. Stearns
Attorney, Agent, or Firm—Warren M. Becker

[57] ABSTRACT

Plumbing devices (10,30,60) are described comprising a source of light in a gimbal system (12,13,51,72) for providing two oppositely directed aligned vertically oriented beams of light. The gimbal system (12,13,51,72) is removably attached to a support (14,31,61). A handle (14a,45,62) is provided for holding the plumbing device at various distances from underlying and overlying surfaces. Each of the light beams can be focused individually. A windshield (15) is provided for removable attachment to the support for preventing wind induced oscillation of the light source. A rigid frame (32,33,65) is provided for holding the light source in a fixed position relative to an object to be plumbed and for removable attachment to the object while the object is being plumbed.

19 Claims, 9 Drawing Figures

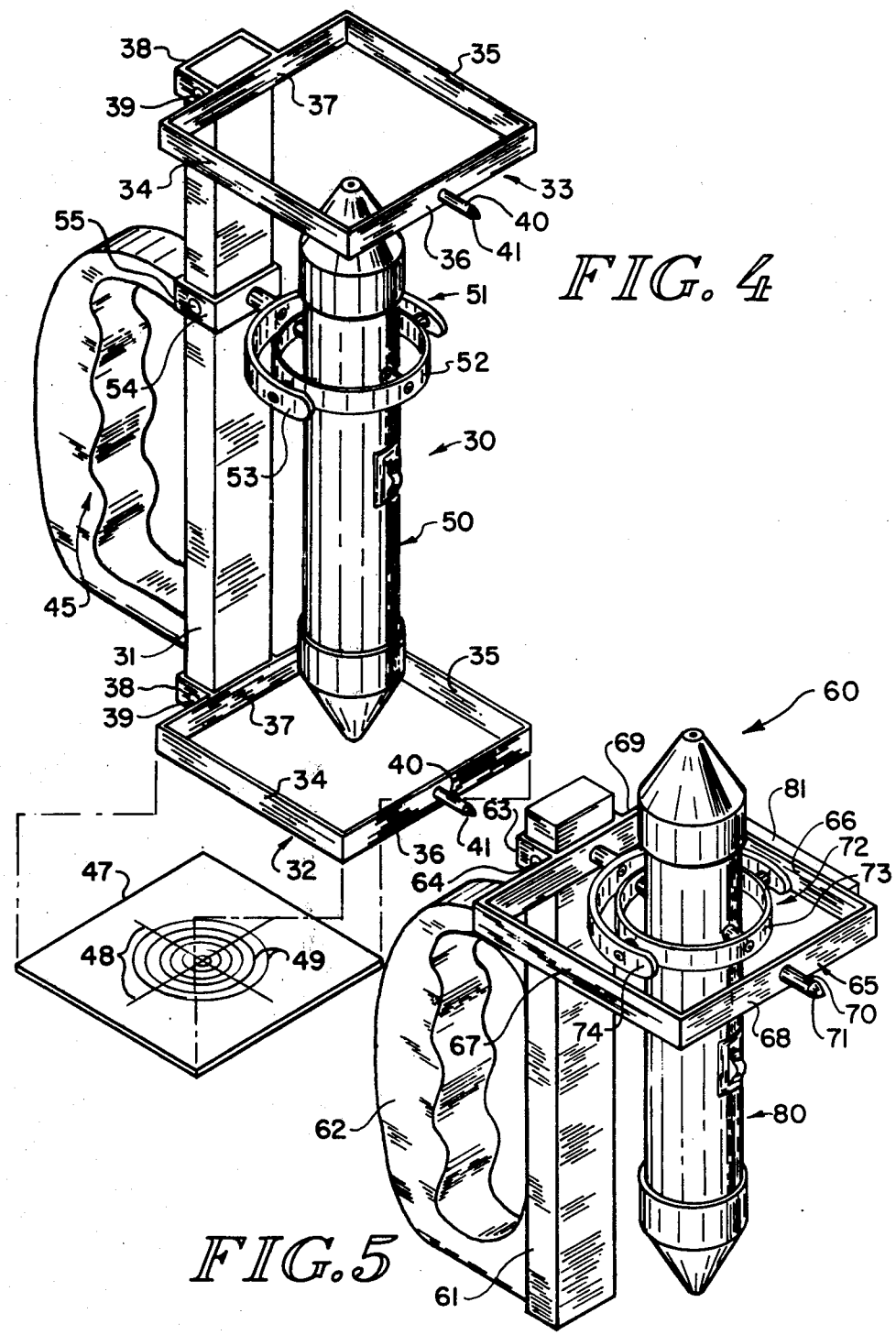

POINT-TO-POINT SELF-PLUMBING APPARATUS AND METHOD

This is a continuation-in-part of application Ser. No. 712,868 now U.S. Pat. No. 4,106,107, filed Aug. 9, 1976.

BACKGROUND OF THE INVENTION

The present invention relates to plumbing methods and apparatus in general and in particular to an apparatus and method for plumbing structural members, such as structural steel columns and beams, walls and the like and nonstructural members, such as door jambs, partitions and the like.

The vertical alignment of columns, beams, wall members, door jambs and the like has heretofore been achieved with the use of plumb bobs, bubble levels and more recently, various types of laser devices. Plumb bobs are relatively heavy, typically stainless steel, pointed objects, which are suspended on a string from some preselected overlying point. The plumb bob defines a second point vertically below the overlying point. The bubble level comprises a relatively small tubular, generally transparent member for holding a fluid. In the fluid there is provided a bubble of air or the like. In use the tubular member is held against an object to be plumbed. The position of the bubble of air in the fluid indicates the position of the object to be plumbed relative to the vertical. In the more recent laser plumbing devices there is provided a beam of light for providing horizontal and vertical alignment of an object.

While each of the above described plumbing devices are useful in certain applications, all have certain disadvantages. For example, the plumb bob requires the suspension of a weighted member between spaced points. This may and often frequently requires the use of ladders, scraffolding or the like in high places. Frequently a user must hang over a ledge or floor member to use the plumb bob. This is dangerous and often difficult to do if the point being plumbed is more than a few feet from the ledge or floor on which the user is standing. Also, because the bob is subject to wind movement, its use outside may be impossible on windy days.

The use of the bubble level for plumbing long members is limited by its relatively short length and normal use requires frequent checking and realignment of the bubble.

Despite the precision of available presently used laser plumbing devices, they are often cumbersome and hard to work with. Their sophisticated construction results in high initial costs and maintenance. Also none of the laser plumbing devices presently known to be in use, are usable in a single step plumbing operation. This is because they are not self leveling but must themselves be adjusted for each operation to make sure they are level before they can be used.

SUMMARY OF THE INVENTION

In view of the foregoing, principal objects of the present invention are a plumbing method and a point-to-point self-plumbing apparatus which is reliable, easy to use and does not suffer from the aforementioned disadvantages of prior known plumbing apparatus.

Other objects of the present invention are a method and apparatus for generating from a source of light two oppositely directed aligned beams of light and a method and apparatus as described above for orientating the light beams vertically pendulously for generating a spot of light on a surface located vertically above and below the light source.

Other objects of the present invention are a method and apparatus as described above for placing the vertically oriented light beams adjacent to an object to be plumbed for generating a spot of light from one of the beams on a surface adjacent to each end of the object to be plumbed.

Other objects of the present invention are a method and apparatus as described above for adjusting the position of each of the ends of the object to be plumbed relative to the adjacent light spot while the source of light is held firmly against the object to be plumbed. The surface on which the spot of light is generated may be separated from the object being plumbed or on a member extending therefrom.

Still other objects of the present invention are a method and apparatus as described above wherein there is provided a gimbal system and means for suspending a light source from the gimbal system and wherein the means for holding the light source firmly against the object to be plumbed comprises a handle and a rigid member. The rigid member is provided for placement against the object to be plumbed and simultaneously permits the light source to swing freely and pendulously in the gimbal system while the object is being plumbed. Means are also provided for removably attaching the light source to the object to be plumbed while it is being plumbed.

Other objects of the present invention are a method and apparatus as described above comprising a plumbing apparatus which is safe, low cost and can be operated by a single person.

In addition to the above objects and features there is provided a removable windshield for preventing wind induced oscillation of the light source and means for individually focusing each of the light beams emanating from the light source.

BRIEF DESCRIPTION OF THE DRAWINGS

The above and other objects features and advantages of the present invention will become apparent from the following detailed description of the accompanying drawings in which:

FIG. 4 is a perspective view of an alternative embodiment of the present invention.

FIG. 5 is a perspective view of still another embodiment of the present invention.

DETAILED DESCRIPTION

Figures 1, 2, 3:
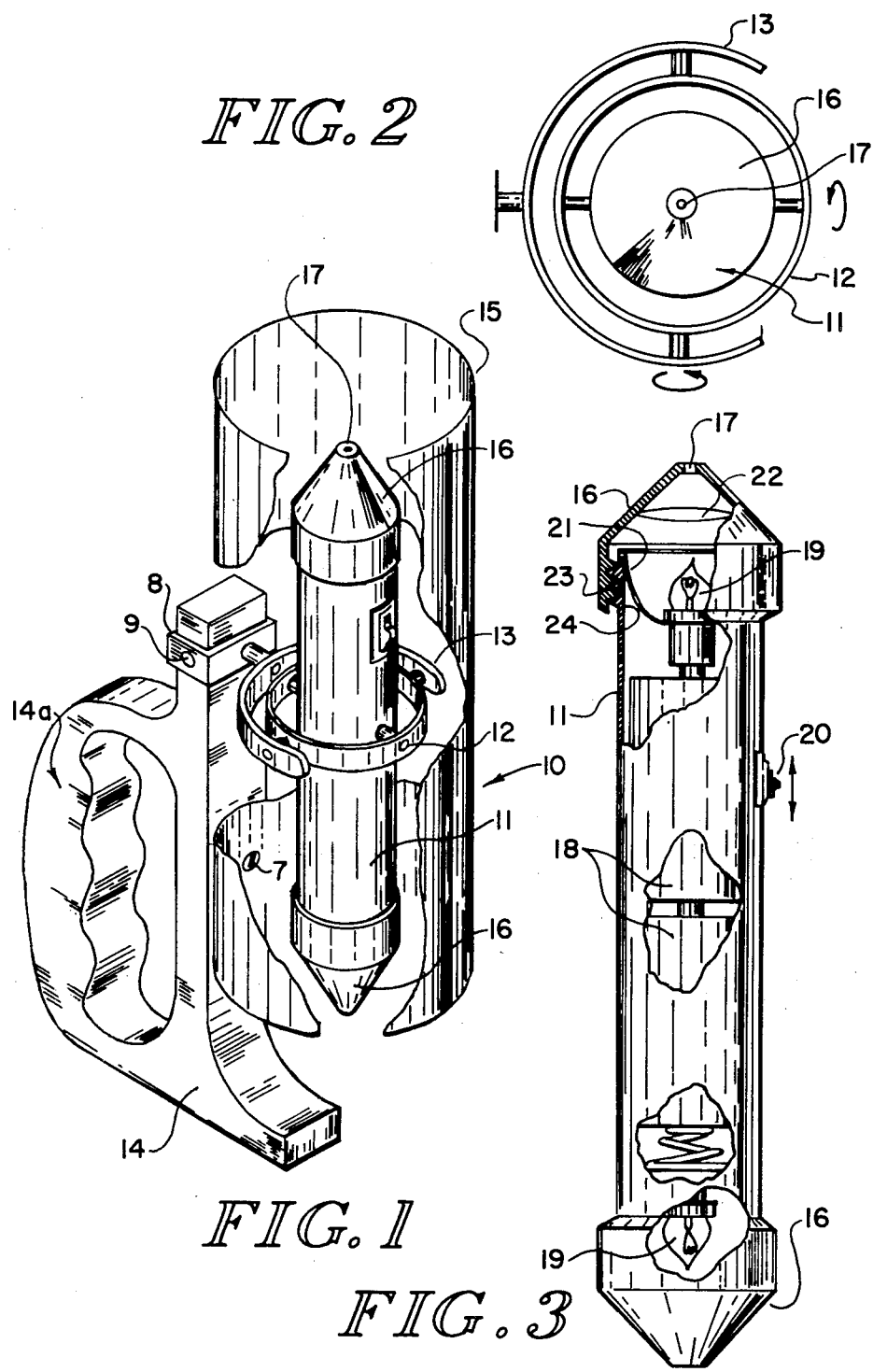
FIG. 1 is a perspective view of a plumbing apparatus according to the present invention with a windshield partially broken away.
FIG. 2 is the top view of the plumbing apparatus of FIG. 1 without the stand and the windshield.
FIG. 3 is a broken away elevational view of a tubular housing used in the plumbing apparatus of FIG. 1.

Referring to FIG. 1, there is provided according to the present invention a plumbing device 10. In the plumbing device 10 there is provided a source of light for generating two oppositely directed aligned beams of light in a tubular aluminum housing 11. The housing 11 is suspended in a gimbal system comprising a plurality of gimbal rings 12 and 13. The rings 12 and 13 are removably mounted by a bracket 8 and a set screw 9 to a stand 14. Forming a part of the stand 14 is a handle 14a. The handle 14a is provided for holding the plumbing device 10 at selected distances from underlying and overlying surfaces.

Removably attached to the stand 14 as by one or more screws 7 is a windshield 15. The windshield 15 is provided for preventing wind induced oscillation of the housing 11. At opposite ends of the housing 11 there is provided a pair of nose cones 16. Each of the nose cones 16 is provided with a centered opening 17. The openings 17 are provided for transmitting light above and below the housing.

As seen in FIG. 1, tubular housing 11 is pivotally suspended in the gimbal ring 12 and the gimbal ring 12 is pivotally suspended in the center of the gimbal ring 13. The gimbal rings 12 and 13 are in turn connected to the housing 11 in such a manner and at a position sufficiently above its center of gravity, such that the housing becomes self leveling, thereby enabling the housing to retain a plumb position once it has been set. In practice, the pivotal connections between the gimbals and housing 11 have the lowest practical coefficient of friction consistent with providing maximum accuracy.

Referring to FIG. 3, there is provided in tubular housing 11 comprising the light source a pair of tubular housing 11 comprising the light source a pair of storage batteries 18. Batteries 18 are electrically connected as by a switch 20 to a pair of light bulbs 19 at the upper and lower ends of the housing 11. Each of the light bulbs 19 has a concave reflector plate 21 at its base and one or more associated lenses 22 in the nose cones 16. The cones 16 are provided with threads 23 for engaging threads 24 on the housing. The cones 16 are threaded for focusing and colluminating the light beams therefrom into a pair of vertically aligned beams which are centered in the openings 17 and form spots of light above and below the housing. The focusing and colluminating of the beams into spots of light above and below the housing are provided so that a single operator can plumb a point above and below the housing in a single operation. This avoids the necessity of moving equipment such as laser equipment from a first position to a second position to obtain a pair of intersecting lines for forming a plumb point as has been required in the past.

Referring to FIG. 4, there is provided in an alternative embodiment of the present invention a plumbing apparatus 30. In the apparatus 30 there is provided an elongated generally rectangularly shaped supporting member 31. At opposite ends of the supporting member 31 there is provided a pair of identically shaped rigid frame members 32 and 33. Each of the frame members 32 and 33 comprise an open ended, narrow box-like structure having four side walls 34, 35, 36 and 37. Extending from the exterior of the sidewall 37 there is provided a mounting bracket 38. The mounting bracket 38 is provided for fitting over and surrounding the ends of the supporting member 31. A set screw 39 or the like is provided for removably attaching the mounting bracket 38 to the ends of the supporting member 31. Opposite the wall 37 and extending from the exterior of the side wall member 36 there is provided a dowel pin 40. The dowel pin 40 is provided at its free end with a pointed portion 41.

Between the frame members 32 and 33 and extending from one side of the supporting member 31 there is provided a handle 45. The handle 45 is provided for supporting the apparatus 30 at selected distances from underlying and overlying surfaces and for holding the apparatus firmly against an object to be plumbed as will be described in further detail below.

Also located between the frame members 32 and 33, but on the opposite side of the supporting member 31, there is provided a tubular housing 50. The housing 50 is pivotally suspended in a gimbal system 51, comprising a plurality of gimbal rings 52 and 53. The gimbal system 51 and the housing 50 are removably attached to the support 31 by means of a bracket 54 and a set screw 55.

Removably attached to the apparatus, such as the lower frame member 32, by clips or the like (not shown) there is provided a graduated target 47. If mounted to frame 33, the target material is generally translucent so that a beam of light on one side of the target can be seen from the opposite side. Inscribed on the target 47 is a pair of orthogonal cross-hairs 48 and a plurality of concentric rings 49. Each of the rings 49 is provided with a predetermined diameter for purposes of measuring the vertical orientation of a member against which the apparatus is held.

In FIG. 1, housing 11 is shown as being attached to the gimbal system comprising gimbal rings 12 and 13 relatively close to its center. It is understood, however, that the center of gravity of the housing 11 is below the gimbal system such that the housing 11 is self plumbing. In FIG. 4 the gimbal system 51 is pivotally attached to the housing 50 near the top of the housing 50. In certain applications the latter arrangement may be preferred in that the center of gravity is generally positioned lower than that present in the device of FIG. 1. In all other respects, however, the housing 50 comprising the light source and the gimbal system 51 of FIG. 4 are identical to the housing 11 comprising the light source and gimbal system of FIG. 1.

In practice, the apparatus of FIGS. 1 and 4 may be used in a number of ways to plumb an object. For example, in one procedure, when plumbing a door jamb having a pair of vertical side jamb members and an intermediate horizontal top jamb member, the apparatus is set on the floor adjacent to the base of one of the vertical jamb members. For this procedure the target 47 of the apparatus of FIG. 4 is removed. After the light bulbs are turned on, and after the oscillations on the housing are stopped, the device has self leveled. When the device has leveled, a spot of light will appear below and above the apparatus on the floor and on the horizontal jamb member respectively. At that point the distance from the base of the jamb to the spot of light on the floor is measured. This distance is marked off on the horizontal jamb member from the upper end of the vertical jamb member. After the horizontal jamb member has been marked, the vertical jamb member is moved until the mark on the horizontal jamb member is placed in registration with the spot of light thereon. When this is done, and if the lower end of the jamb member adjacent to the apparatus has not moved, the vertical jamb member and the attached horizontal and opposite vertical jamb members are plumbed.

While the apparatus is sitting on the floor adjacent the vertical jamb member the stand 14 of the apparatus of FIG. 1 and the frame 32 of the apparatus of FIG. 4 support the apparatus. Alternatively, the apparatus may be held in one hand and pressed against the vertical jamb member while the plumbing operation is being carried out.

To plumb a vertical jamb member or the like while holding the apparatus, the apparatus is held by its handle and pressed firmly against the jamb member. With the apparatus of FIG. 1, the windshield 15 is pressed against the jamb member. With the apparatus of FIG. 4, the dowel pins 40 on the frames 32 and 33 are pressed against the jamb member. With both apparatus, the housing 50 and light source contained therein are held firmly against the jamb member and, as previously described with respect to standing the apparatus on the floor, the jamb is plumbed when the light spots on the floor and on the overlying horizontal jamb member are equidistant from the adjacent ends of the vertical jamb member. In still another, though somewhat less accurate procedure, using the hand held device the target member 47 is attached to the frame 32 of the apparatus of FIG. 4. The plumbing operation is then carried out by reference to the position of the lower light beam on the target. When the beam is centered on the cross hairs, the object being plumbed is plumbed.

Referring to FIG. 5 there is provided in an alternative embodiment of the present invention another hand held self-leveling plumbing apparatus 60. In the apparatus 60 there is provided a generally rectangular, elongated support member 61. Extending from the support member 61 there is provided a handle 62. The handle 62 is provided for holding the apparatus 60 at selected distances from an underlying and overlying surface and also for holding the apparatus against an object to be plumbed. Opposite from the handle 62 there is removably attached to the support 61 as by a bracket 63 and a set screw 64 a rigid frame member 65. In the frame member 65 there is provided four side walls 66, 67, 68, and 69. The bracket 63 extends from the side wall 69 for fitting over the support member 61. Extending from the side wall 68 there is provided a dowel 70 having a pointed end 71 for placement against an object to be plumbed.

The dowel 70 is also provided for removable insertion in a hole provided therefore in an object to be plumbed. This permits a user to have both hands free for plumbing the object as will be described.

In the center of the frame 65 there is provided a gimbal system 72 comprising a pair of gimbal rings 73 and 74. The gimbal ring 73 is pivotally coupled to the gimbal ring 74. The gimbal ring 74 is attached in a cantilever fashion to the interior side of the sidewall member 69.

Pivotally suspended in the center of the gimbal ring 73 there is provided a tubular housing 80 comprising a light source. The housing 80 including the light source and the gimbal system 72 are identical to the housing 50 including the light source and gimbal system 51 of the apparatus of FIG. 4, and function in the same manner as will be described in further detail below. Attached to the exterior surface of the sidewall 66 there is provided a generally rectangular elongated magnet 81. The magnet 81 is provided for magnetically holding the frame 65 and associated gimbal 72 and housing 80 on an object to be plumbed.

In practice, the apparatus of FIG. 5 is used by holding the apparatus using the handle 62 against an object to be plumbed, by attaching the frame 65 to an object to be plumbed magnetically by means of the magnet 81 or by inserting the dowel pin 70 in a hole provided therefore in the object to be plumbed. In the latter two cases, it is frequently convenient to remove the frame 65 from the support 61 by loosening the set screw 64 and sliding the bracket 63 from the support 61. The removal of the frame 65 from the support 61 and the attachment thereof either by the magnetic member 81 or the dowel pin 70 to the object to be plumbed is particularly useful when one person is plumbing an object. This is because it frees the hands of the person, thereby making it easier for the person to adjust the position of the ends of the object to be plumbed, permits the person to more easily secure the object when it is plumbed and permits the object being plumbed to be moved a greater distance than is normally possible when the plumbing device is not physically attached thereto.

Figure 6:
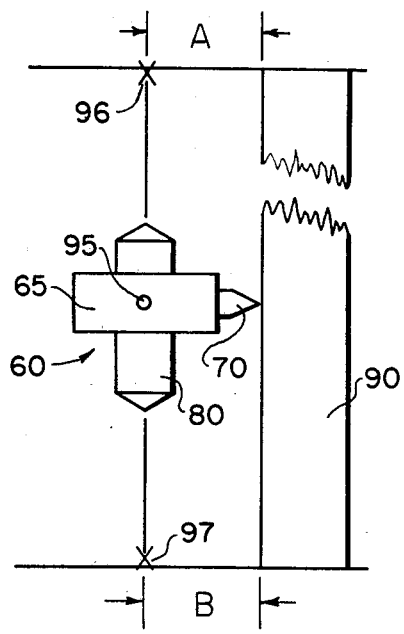
FIGS. 6 and 7 are diagrammatic views showing relative distances between the apparatus of FIG. 5 and an object to be plumbed.
Figure 7:
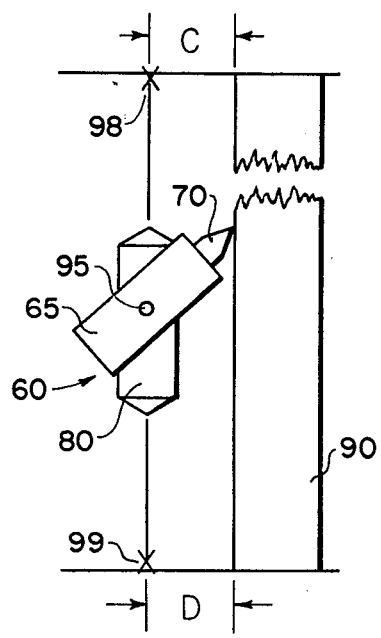

Referring to FIGS. 6 and 7, there is represented as an object to be plumbed a beam 90 and the plumbing apparatus 60 of FIG. 5 in two positions relative to the beam 90. In the apparatus 60 the tubular housing 80 including the light source is pendulously suspended in the frame 65. The dowel pin 70 or the like, which extends from the frame 65 in conjunction with the handle (not shown) is used for holding the apparatus 60 firmly against the object to be plumbed. One of the axes of rotation of the housing 80 relative to the frame 65 is shown at 95. As in all conventional gimbal systems, the various axes of rotation of the gimbal system of the apparatus 60 are orthogonal.

When holding the apparatus of the present invention against an object to be plumbed, it is only necessary that the apparatus be held firmly against the object to be plumbed and, for convenience, in a relatively fixed position during the plumbing operation so as to facilitate the plumbing operation. As shown in FIGS. 6 and 7, the specific distance of the apparatus from the object to be plumbed may vary without effecting the utility of the apparatus. For example, in FIG. 6 the axis of the dowel pin 70 is approximately perpendicular to the beam 90. With the axis of the dowel pin 70 perpendicular to the beam 90, the light beam emanating from the top of the apparatus impinges on an overlying surface as at a point 96 and on an underlying surface as at a point 97. The upper end of the beam 90 is a distance A from the adjacent light spot 96. The lower end of the beam 90 is a distance B from the adjacent light spot 97. When the beam 90 is plumbed, the distances A and B are equal.

Referring to FIG. 7, the axis of the frame 65 and dowel pin 90 are shown at an angle other than ninety degrees from the beam 90. This results in a spot of light at a point 98 on an overlying surface and a spot of light at a point 99 on an underlying surface which are respectively a distance C and D from the adjacent ends of the beam 90. When the axis of the frame 65 and dowel pin 70 are at an angle other than ninety degrees from the beam 90, the distance C is less than the corresponding distance A, and the distance D is less than the corresponding distance B shown in FIG. 6. Nevertheless, due to the pendulous suspension of the housing 80 in the frame 65 the distances C and D, just as are the distances A and B, are equal when the beam 90 is plumbed.

Figure 9:
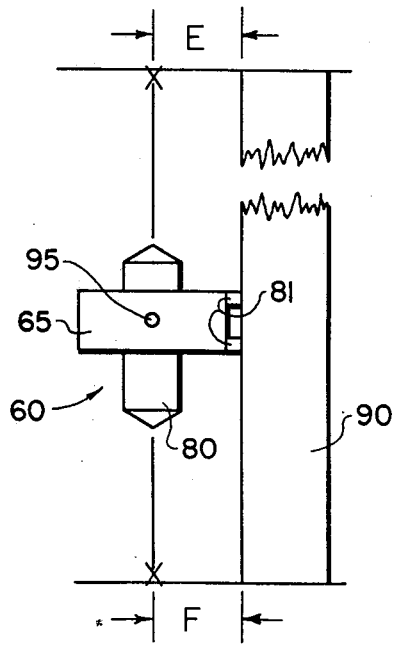
FIGS. 8 and 9 are diagrammatic views showing the apparatus of FIG. 5 removably attached to an object to be plumbed with and without a plumbing target on the object respectively.
Figure 8:
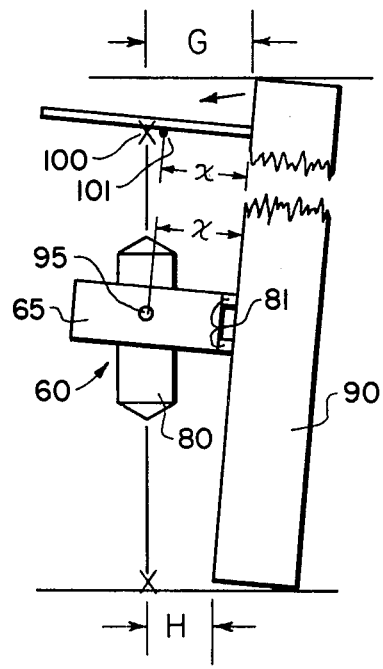

Referring to FIGS. 8 and 9 there is shown a representation of the apparatus 60 of FIG. 5, removably attached to the beam 90 by the magnetic member 81. Alternatively, the apparatus could be attached to the beam 90 using the dowel 70 or any other suitable means.

At the top of the beam 90 there is provided a target 100. The target 100 is provided for providing a surface against which the upper beam of the apparatus 60 is projected. Located between the end of the target 100 and the beam 90 there is provided an indicator 101. The indicator 101 is located at a predetermined distance from the beam end of the target 100. This distance, designated X, corresponds to the distance between the axis 95 of the gimbal system 72 and the beam end of the apparatus 60.

When plumbing the beam 90 with the target 100, the beam is pivoted until the upper light beam from the apparatus 60 impinges on the target indicator 101. When the upper light beam from the apparatus 60 impinges on the target indicator 101, the beam 90 is plumbed.

As will be appreciated, the apparatus of FIG. 8, and in particular the target 100 is particularly useful for plumbing members which have no overlying surfaces available for projecting a light beam thereon such as long structural members including I-beams and non-structural members including telephone poles and the like.

A number of embodiments of the present invention are described. It is contemplated, however, that various modifications and changes to the embodiments described may be made without departing from the spirit and scope of the present invention. For example, various component parts which may be made of metal such as aluminum and steel may also be constructed from various synthetic materials such as a variety of plastic materials which are suitable for such devices. Also, the various components may be shaped for specific applications. The light source may also be changed. For example, instead of the incandescent bulbs 19, flourescent or laser light may be used. Instead of batteries, conventional 100 volt power sources may be used. Also, an adjustable marking pole can be appended to the device for marking the spot plumbed, and the windshield can be adapted for use on any of the embodiments and as a carrying case for other members of the apparatus. Accordingly it is intended that the scope of the present invention be not determined solely by reference to the embodiments described, but rather be determined by reference to the claims hereinafter provided and their equivalents.

What is claimed is:

1. A point-to-point, self-plumbing apparatus comprising:
    a source of a beam of light;
    means including a cantilever member connected at one end to a supporting member for supporting said source in a cantilever fashion; and
    means coupling said source to the other end of said cantilever member for orientating said light beam pendulously in a self-plumbing manner.

2. An apparatus according to claim 1 comprising means for focusing said beam of light on a surface illuminated by said beam.

3. An apparatus according to claim 1 wherein said coupling means comprises at least two axes of movement of said light source and comprising means for interposing in said beam of light a target member, and means for locating said axes of movement of said light source a predetermined distance from said object being plumbed for indicating the position of the object being plumbed relative to a vertical position when the object is within a predetermined distance from said vertical position.

4. An apparatus according to claim 3 wherein the interposing means comprises a target and means for extending the target from an object to be plumbed.

5. An apparatus according to claim 3 wherein the interposing means comprises a target; and means for attaching the target to a rigid member coupled to said coupling means from which the source of light is pendulously suspended.

6. An apparatus according to claim 1 wherein said orientating means comprises a gimbal system and means for providing a clearance space for the light source to swing freely pendulously in the gimbal system while the object is being plumbed.

7. An apparatus according to claim 1 wherein said supporting means comprises means forming a handle for holding the apparatus at selected distances from a surface.

8. An apparatus according to claim 1 wherein said supporting means comprises means for removably attaching the apparatus to the object to be plumbed.

9. An apparatus according to claim 8 wherein the means for removably attaching the apparatus to the object to be plumbed comprises magnetic means for magnetically holding the apparatus against the object to be plumbed.

10. An apparatus according to claim 8 wherein the means for removably attaching the apparatus to the object to be plumbed comprises a fitting extending therefrom which is removably insertable in a hole provided therefore in or on the object to be plumbed and means for providing a clearance space for the light source to swing freely pendulously relative thereto while the object is being plumbed.

11. A method of plumbing an object comprising the steps of:
    providing from a source of light two oppositely directed aligned beams of light;
    orientating the light beams pendulously; and
    interposing in one of the beams of light from said light source a target member; said target member having a predetermined position relative to said object, and said light source being movable relative to said target member in response to a movement of said object for indicating by a light spot on said target member the position of the object being plumbed relative to a predetermined object position when the object is within a predetermined distance from said predetermined object position.

12. A method according to claim 11 wherein the step of interposing a target in one of the beams of light comprises the step of locating a target on a surface adjacent one end of said object to be plumbed.

13. A method according to claim 11 wherein the step of interposing a target comprises the step of placing a target on a rigid member from which the source of light is pendulously suspended.

14. A method of plumbing an object comprising the steps of:
    providing a source of light;
    providing a beam of light from said source of light;
    providing a light source supporting means;
    supporting said light source pendulously on said light source supporting means for pendulously orientating said beam of light from said light source relative to an object to be plumbed;
    providing a supporting member; and
    supporting said light source supporting means by a cantilever member connecting said light source supporting means to said supporting member.

15. A method according to claim 14 wherein said step of pendulously orientating said beam of light relative to an object to be plumbed comprises the steps of:
  placing a spot of light from said pendulously orientated beam of light on the surface of a target having a fixed position relative to said object to be plumbed, said object and said target being movable relative to said beam of light, and said spot of light moving on said target as said object is moved relative to said beam of light; and
  moving said object relative to said beam of light to position said spot of light on a predetermined location on said target surface, said predetermined location on said target surface corresponding to a predetermined orientation of said object to be plumbed.

16. A method according to claim 14 comprising the step of focusing said beam of light on a surface illuminated by said beam.

17. A method according to claim 14 wherein said step of pendulously orientating said light beam comprises the steps of:
  shining said beam on a surface adjacent to the object to be plumbed for providing a light spot on said surface adjacent to the object to be plumbed; and
  adjusting the position of said object to be plumbed relative to said adjacent light spot until said object is at a predetermined position relative to said light spot.

18. A method according to claim 17 wherein the step of shining said beam on a surface adjacent to the object to be plumbed comprises the step of holding a rigid member extending from said supporting means from which the source of light is pendulously suspended against the object to be plumbed while the object is being plumbed.

19. A method according to claim 18 wherein the step of placing the rigid member against the object to be plumbed comprises the step of removably attaching the rigid member to the object to be plumbed.

* * * * *